United States Patent [19]
Haynes

[11] Patent Number: 4,748,846
[45] Date of Patent: Jun. 7, 1988

[54] TANK GAUGING SYSTEM AND METHODS

[75] Inventor: John S. Haynes, Greensboro, N.C.

[73] Assignee: Gilbarco, Inc., Greesnboro, N.C.

[21] Appl. No.: 39,772

[22] Filed: Apr. 14, 1987

Related U.S. Application Data

[63] Continuation of Ser. No. 884,870, Jul. 10, 1986, abandoned, which is a continuation of Ser. No. 753,795, Jul. 8, 1985, abandoned, which is a continuation of Ser. No. 434,386, Oct. 14, 1982, abandoned.

[51] Int. Cl.$^4$ ............................................. G01F 23/28
[52] U.S. Cl. ...................................... 73/290 V; 73/291
[58] Field of Search ....................... 73/290 V, 628, 313, 73/292; 364/509, 571, 564, 575; 367/151, 908

[56] References Cited

U.S. PATENT DOCUMENTS

| | | | |
|---|---|---|---|
| 2,713,263 | 7/1955 | Tumer | 73/290 V |
| 2,787,160 | 4/1957 | Van Valkenburg | 73/290 V |
| 3,113,456 | 12/1963 | Smith, Jr. et al. | 73/290 V |
| 3,184,969 | 5/1965 | Bolton | 73/290 V |
| 3,214,974 | 11/1965 | Altman et al. | 73/290 V |
| 3,394,589 | 7/1968 | Tomoika | 73/628 X |
| 3,520,186 | 7/1970 | Adams et al. | 73/290 V |
| 3,693,445 | 9/1972 | Johnson | 73/313 X |
| 3,745,829 | 7/1973 | Franchi | 73/290 V |
| 3,985,030 | 10/1976 | Charlton | 73/290 V |
| 4,084,582 | 4/1978 | Nigam | 367/908 X |
| 4,161,715 | 7/1979 | Harris | 73/149 X |
| 4,203,324 | 5/1980 | Baumoel | 73/290 V |
| 4,210,969 | 7/1980 | Massa | 367/908 X |
| 4,221,004 | 9/1980 | Combs et al. | 73/290 V X |
| 4,229,798 | 10/1980 | Rosie et al. | 73/290 V X |
| 4,236,144 | 1/1980 | Sungawa | 374/142 X |
| 4,241,432 | 12/1980 | Barber et al. | 367/151 |
| 4,320,659 | 3/1982 | Lynnworth et al. | 73/290 V X |
| 4,337,656 | 7/1982 | Rapp | 73/290 V |
| 4,361,037 | 11/1982 | Hauschild et al. | 364/509 X |
| 4,470,299 | 9/1984 | Soltz | 73/290 V |
| 4,578,997 | 4/1986 | Soltz | 73/290 V |

Primary Examiner—Daniel M. Yasich

[57] ABSTRACT

Ultrasonic apparatus for measuring and remotely displaying the amount of liquid in a tank, the amount of water in the tank and the velocity of sound through the liquid in the tank is described with special application to a buried tank containing gasoline with the possibility of water in the bottom of the tank. The apparatus includes an ultrasonic transducer at a fixed distance above the bottom of the tank, a plurality of submerged reflectors vertically arranged at fixed distances above the transducer and a remote console, containing a computer, for activating the transducer and receiving signals of ultrasonic reflections developed by the transducer. Methods are disclosed utilizing the apparatus for computing the height of the liquid (gasoline) level, the depth of the water, if any, the velocity of sound through the gasoline and through the liquid as a whole, and for computing average temperature of the liquid in the tank. In the preferred embodiment, the reflectors are thin, planar sheets increasing in horizontal length with increasing distance from the transducer, the lower edges of which may be concave to maximize the reflections of ultrasonic pulses from the transducer back through the fluid to the transducer.

12 Claims, 9 Drawing Sheets

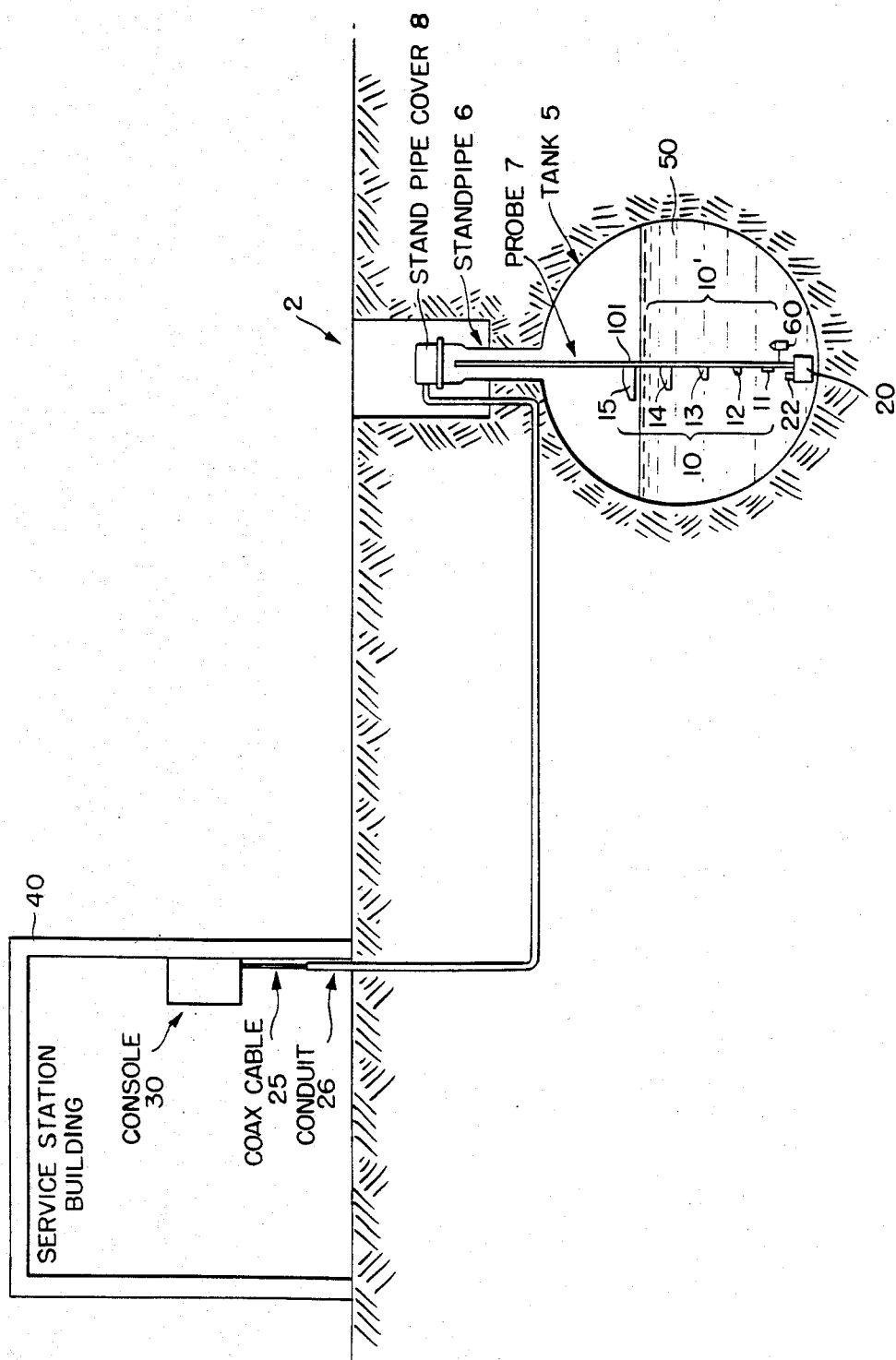

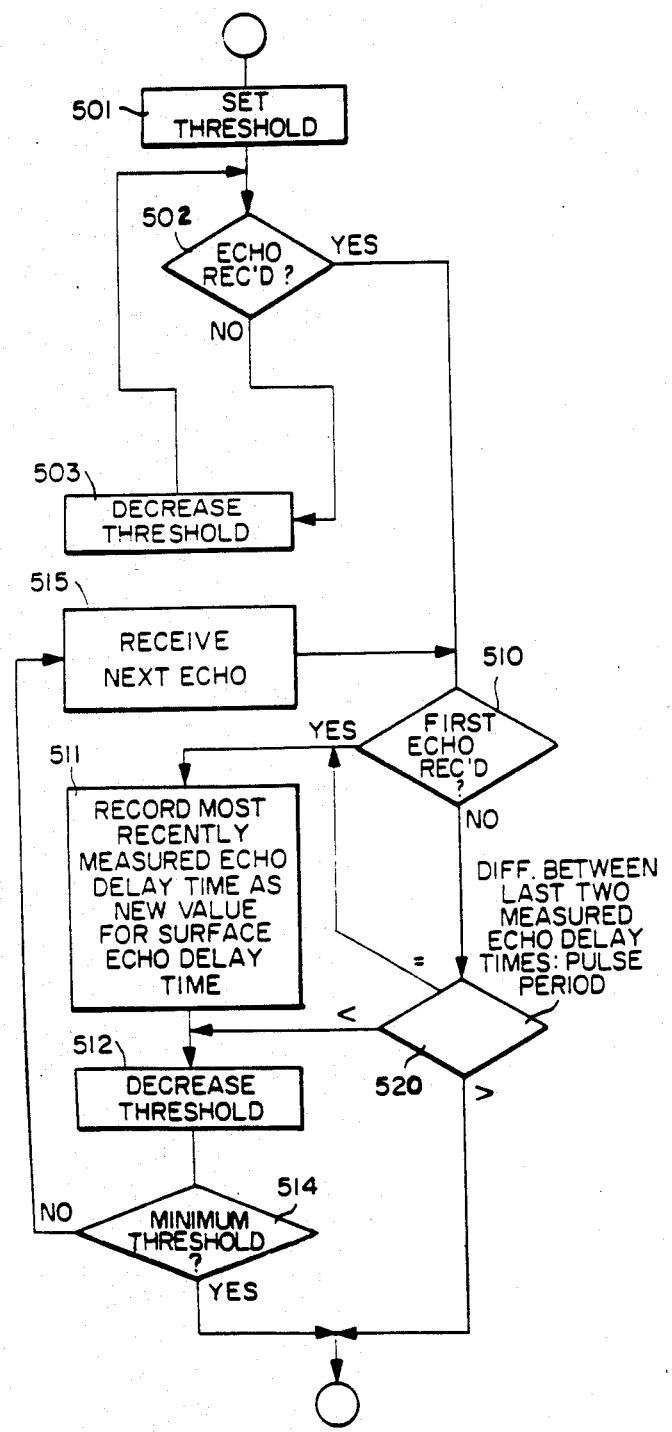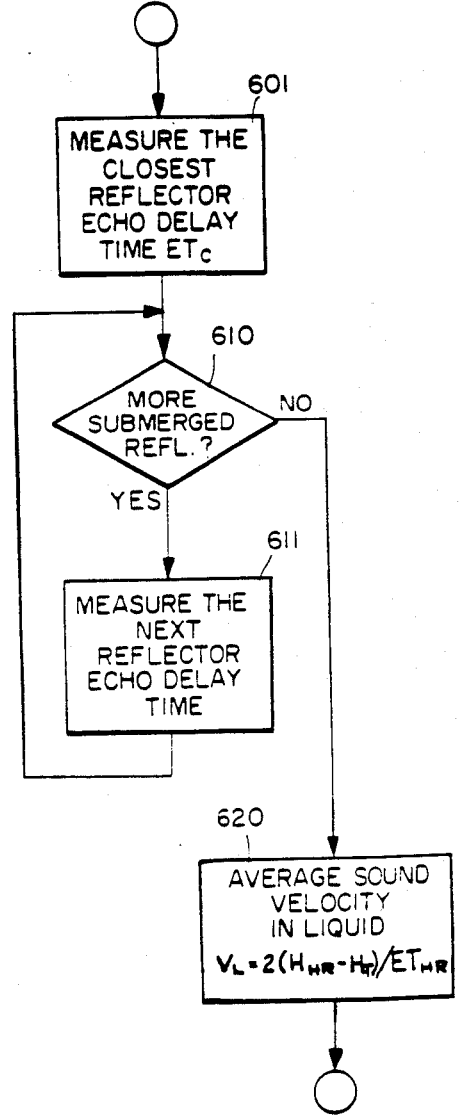

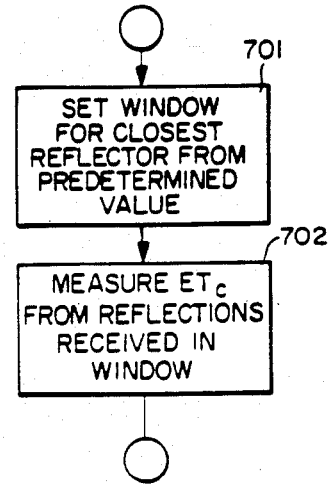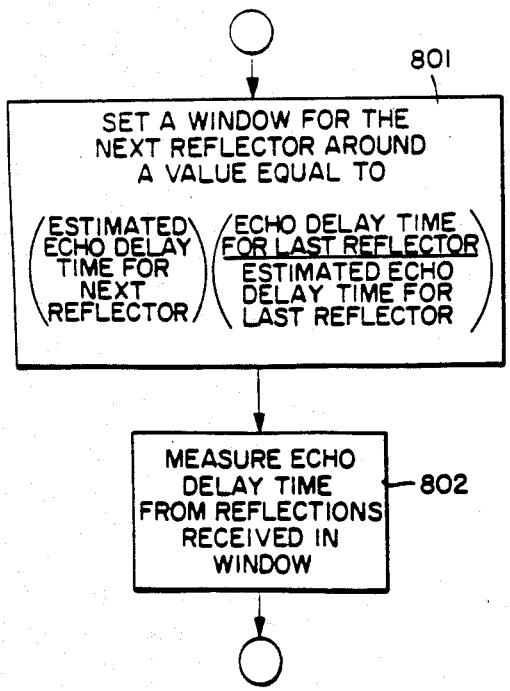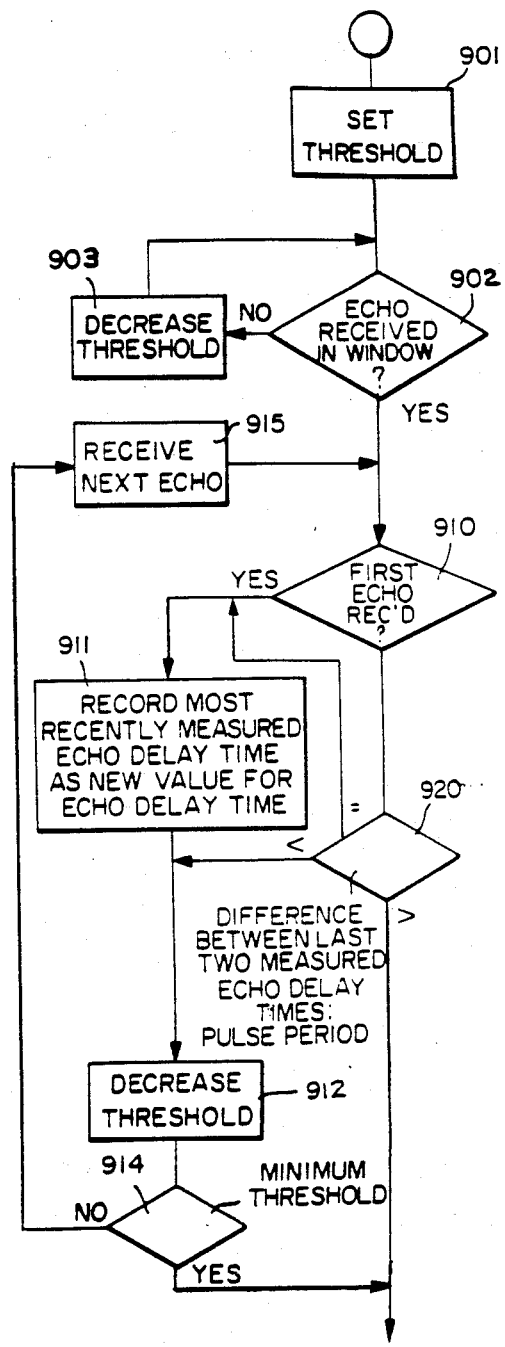

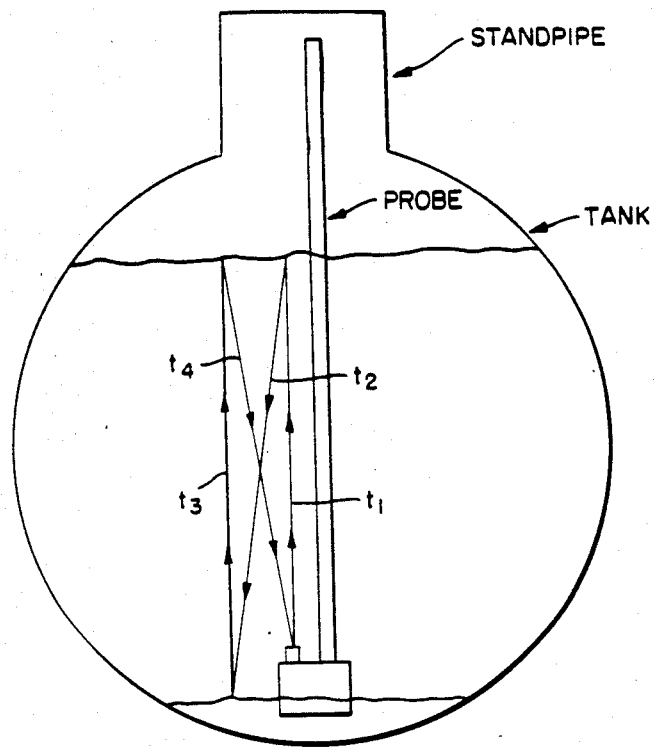
FIG. 13
FIG. 14.
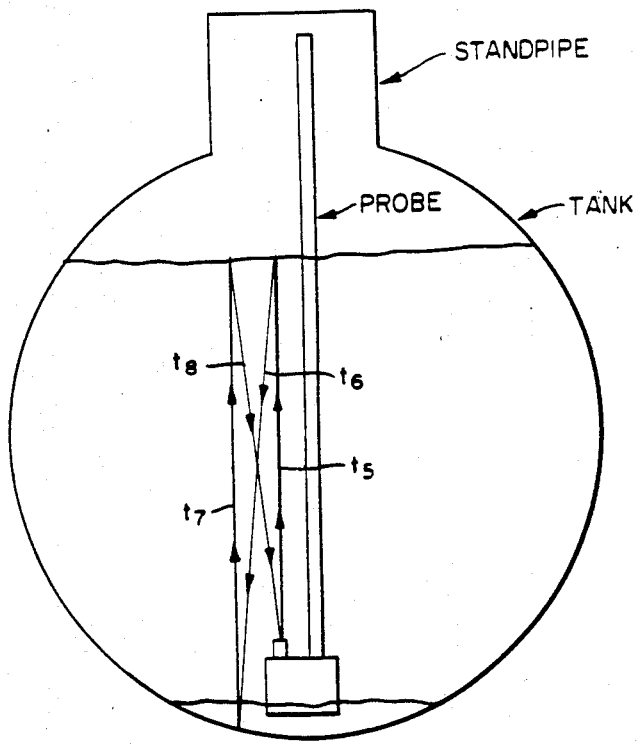

TANK GAUGING SYSTEM AND METHODS

This application is a continuation of application Ser. No. 884,870, filed 7/10/86, which is a continuation of application Ser. No. 753,795, filed 7/8/85, which is a continuation of application Ser. No. 434,386, filed 10/14/82, the three last named applications all now being abandoned.

BACKGROUND OF THE INVENTION

The present invention relates to the field of measuring the volume of liquid in a tank and in particular, to making such measurement using ultrasound.

Many liquids, like gasoline, are stored in large underground tanks where the volume of the liquid in the tank cannot be observed directly. The oldest and perhaps the most common way of determining the volume of such liquid is to insert a calibrated rod into the tank and read the height of the liquid from the line formed on the rod by the liquid's surface.

This method, however, provides only coarse estimates of liquid volumes because there are inherent errors in the system. For example, the person using the rod for measurement might not insert the rod perfectly vertically into the tank or might read the calibrations incorrectly.

The lack of precision provided in this method of volume measurement is most limiting in attempts to detect the slow loss of gasoline due to leakage. Leakage of gasoline from underground tanks can cause serious environmental problems and result in devastating legal liabilities. If such leakage could be detected at an early stage, the tank could be repaired or replaced at a fraction of that environmental and economic cost.

The use of a calibrated rod to measure the level of gasoline also has the added disadvantage of requiring the attendant to leave the security of the service station building. This can be dangerous for the attendant and it leaves the building unattended and vulnerable to robbery or vandalism.

One development in the area of liquid volume measurements has been ultrasonic ranging systems. One such system uses ultrasonic transmitters positioned above the liquid to measure the distance of the surface of the liquid from the transducer. Examples of this type of system are shown in U.S. Pat. No. 4,221,004 issued to Combs et al. on Sept. 2, 1980 and U.S. Pat. No. 3,184,969 issued to Bolton on May 25, 1965. These ultrasonic ranging systems are generally more accurate than a calibrated rod and they do not require a service station attendant to leave the building.

Unfortunately, these types of ultrasonic ranging systems are still not accurate enough for many uses. Such systems, for example, cannot determine whether a drop in the volume of the liquid is from loss of the liquid or from contraction due to a drop in the liquid's temperature. Adding a temperature detector will provide only limited correction since the temperature of gasoline usually varies over its volume and since there is no fixed coefficient of thermal expansion for gasoline which is nonhomogeneous and whose relative concentration of components varies. The knowledge of the temperature at one location in the gasoline is not very helpful when temperature-compensating for volume measurements.

Another attempt to improve the accuracy of ultrasonic volume measuring systems is the addition of calibrators. In U.S. Pat. No. 4,210,969 issued to Massa on July 1, 1980, a small sound reflecting target located a fixed distance from the surface of the ultrasonic transducer is used to help to correct for variations in the velocity of sound in the medium. The system in Massa, however, only detects variations of sonic velocity in the air above the liquid, and not variations in the gasoline.

The system described in U.S. Pat. No. 3,394,589 issued to Tomioka on July 30, 1968 is even more elaborate as it senses the reflections of ultrasonic energy off several equally spaced reflectors to make distance measurements. Although the additional reflectors can more accurately compensate for changes in sonic velocity through air, they also fail to account for changes of gasoline temperature.

Furthermore, ultrasonic ranging systems whose transducers sit above the gasoline cannot detect the presence of water in the bottom of the tank. If there is water below gasoline in a tank and a station operator, measuring the height of the liquid, does not recognize the presence of the water, the water may be accidentally pumped into a customer's tank. If this happens, the station operator runs the risk not only of losing customers, but also of possible legal action.

Conventional ultrasonic tank gauging systems whose receivers and transmitters are positioned at the bottom of gasoline tanks fail to measure the amount of water in such tanks reliably. Examples of such systems are described in U.S. Pat. No. 3,693,445 issued to Johnson on Sept. 26, 1972; U.S. Pat. No. 3,985,030 issued to Charlton on Oct. 12, 1976; and U.S. Pat. No. 4,229,798 issued to Rosie et al., on Oct. 21, 1970.

When the interface between the water in the gasoline lies very close to the transmitter and the receiver, ultrasonic signals reflected off the gasoline-water interface interfere with the transmission of subsequent signals and the tank gauge does not operate correctly.

The conventional tank gauging systems which have transducers beneath the surface of the liquid do not correct for temperature changes of the liquid. Of the systems listed above, only Rosie et al. measures the temperature of the liquid. Rosie et al., however, uses only a temperature sensor located at one position of the liquid.

One object of the present invention, therefore, is to measure the amount of liquid in a tank with great accuracy.

Another object of the invention is to detect very small leaks in a tank and the theft of small volumes of liquid.

It is also an object of the present invention to detect the presence of water in a gasoline tank and to measure the height of such water accurately.

Another object of this invention is a device and method for accurately measuring the volume of gasoline in an underground tank while avoiding the necessity of a service station employee's having to leave the service station building.

Yet another object of the invention is to measure the amount of gasoline in a tank even when no service station attendant is on duty.

A further object of this invention is to facilitate automatic system auditing so an inventory can be readily taken and product deliveries recorded, even when the service station is unattended.

Yet another object of this invention is to allow gasoline in a tank to be monitored frequently with little error and to provide early warning alarms to a service station operator for any unusual conditions.

Additional objects and advantages of the present invention will be set forth in part in the description which follows and in part will be obvious from that description or may be learned by practice of the invention. The objects and advantages of the invention may be realized and obtained by the methods and apparatus particularly pointed out in the appended claims.

SUMMARY OF THE INVENTION

To achieve the objects and in accordance with the purpose of the invention, as embodied and as broadly described herein, the system of this invention for determining the amount of a liquid in a tank comprises: a plurality of ultrasonic reflectors spaced at predetermied distances from each other so that each of the reflectors lies at a different predetermined height in the tank; a transducer, positioned below the reflectors and designed to be located underneath the surface of the liquid in the tank and at a known height above the bottom of the tank, for transmitting ultrasonic energy into the liquid and for forming data signals representing the reflections of the transmitted energy off of the plurality of reflectors and off of the surface of the liquid; and means for causing the transducer to transmit ultrasonic energy and for receiving the data signals from the transducer in order to determine the volume or height of the liquid in the tank.

More particularly, the system for determining the amount of liquid in a tank comprises: a plurality of ultrasonic reflectors spaced at predetermined distances from each other so that each reflector lies at a different predetermined height in the tank; a transducer positioned below the reflectors and designed to be located underneath the surface of the liquid in the tank and at a known height above the bottom of the tank, for transmitting ultrasonic energy into the liquid and for forming data signals representing the reflections of the transmitted energy off of the plurality of reflectors and off of the surface of the liquid; means for measuring the temperature of the liquid in the tank; and means for causing the transducer to transmit ultrasonic energy and for receiving temperature measurements from the temperature measuring means and the data signals from the transducer in order to determine the volume of the liquid in the tank.

The method of this invention for determining the amount of a liquid in a tank of known dimensions comprises the steps of: transmitting, from a transducer located underneath the surface of the liquid, periodic bursts of pulses toward the surface of the liquid; measuring a surface echo delay time between the transmission of a first set of pulse bursts and the receipt of the reflections of the first set of bursts from the surface of the liquid; measuring a reflector echo delay time for each of a plurality of submerged reflectors lying at different distances above the transducer, the reflector echo delay time for each reflector being the time between the transmission of a set of pulse bursts and the receipt of the set of pulse bursts reflections from that reflector; calculating an average velocity of sound in the liquid from the reflector echo delay times and from the known distances of the plurality of submerged transducers from the transducer; and calculating the amount of the liquid in the tank from the average sound speed and the surface echo delay time.

The method according to this invention of monitoring the volume of a liquid in a tank of known dimensions comprises the steps of: measuring the volume of the liquid in the tank at periodic intervals during a period when no liquid is expected to be added to or removed from the tank; determining the temperature of the liquid during each volume measurement; normalizing the measured volume of the liquid to a reference temperature; and comparing the volume measurements to determine any decreases in the liquid volume.

The method of this invention for determining an average temperature of a liquid comprises the steps of: measuring the average sound velocity of the liquid in the tank; determining a reference sound velocity in the liquid, $V_R$, at a reference temperature of the liquid, $T_R$, and a relational correspondence between change in temperature and change in sound velocity of the liquid $\Delta V/\Delta T$; and determining the average temperature of the liquid from $v_R, T_R$ and $\Delta V/\Delta T$.

A method of this invention for determining the amount of water in a tank containing liquid fuel and water comprises the steps of: transmitting, from a transducer located beneath the surface of the fuel and above the fuel-water interface, a periodic burst of ultrasonic pulses toward the gasoline surface; measuring the combined height of the fuel and water in the tank using the pulse bursts; measuring the fuel-water interfaces echo delay time for a first set of pulse bursts to travel from the transducer, reflect off the surface of the gasoline a first time, reflect off the fuel-water interface a second time and be received by the transducer; and determining from said fuel-water interface echo delay time the height of the water.

Another method of measuring the amount of water in a tank containing fuel and water comprises the steps of: transmitting, from a transducer located beneath the surface of the fuel and above the fuel-water interface, a periodic burst of pulses toward the fuel surface; measuring the temperature of the water and fuel in the tank; measuring, using the pulse bursts, the average velocity of sound in the fuel; measuring, using the pulse bursts, the average velocity of sound in the tank; and determining, from the measured temperature and from the differences between the average velocity of sound in the fuel and the average velocity of sound in the tank, the height of water in the tank.

The accompanying drawings, which are incorporated and which constitute a part of this specification, illustrate one embodiment of the invention and, together with the description, explain the principles of the invention.

BRIEF DESCRIPTION OF THE DRAWINGS

FIG. 1 shows an embodiment of the tank gauging apparatus of this invention;

FIG. 5 is a flow diagram for measuring the surface echo delay time according to a method of this invention;

FIG. 6 is a flow diagram for determining the average velocity of sound in a liquid according to one method of this invention;

FIG. 7 is a flow diagram for measuring the closest reflector echo delay time according to one method of this invention;

FIG. 8 is a flow diagram for measuring a next reflector echo delay time according to one method of this invention;

FIG. 9 is a flow diagram for measuring an echo delay time in a window according to one method of this invention;

FIG. 13 shows the path of an ultrasonic signal used to measure the fuel-water interface echo delay time according to the method shown in FIG. 10;

FIG. 14 shows the path of an ultrasonic signal used to measure the bottom echo delay time according to the method shown in FIG. 11;

DESCRIPTION OF THE INVENTION

A. Tank Gauging System

Figure 2A:
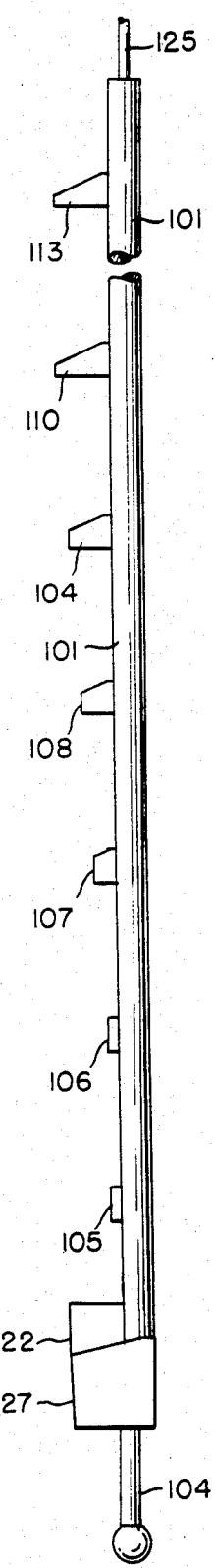
FIG. 2a shows a probe which could be used in the tank gauging apparatus of FIG. 1.

An embodiment of the tank gauging system for measuring the amount of liquid in a tank according to the the present invention is shown in FIG. 1. Tank 5 is filled with a liquid 50 whose volume or height is to be measured by the tank gauging system of this invention. In the description that follows, the term "amount" is used to mean either volume or height.

Tank 5 is set below ground level and is physically accessible only through manhole cover 2. The top of tank 5 includes standpipe 6 which is directly below manhole cover 2 and which is enclosed by standpipe cover 8.

The tank gauging system in FIG. 1 includes a probe 7 extending vertically into liquid 50. Probe 7 includes a plurality of vertically aligned ultrasonic reflectors, shown as 10 in FIG. 1. In FIG. 1, the plurality of reflectors comprises individual reflectors 11-15 which each lie at a different height within tank 5. The function of the reflectors is explained more fully below but their general purpose is to reflect ultrasonic energy and thereby assist in the calibration of the tank gauging system.

FIG. 2a shows probe 7 in more detail. The probe in FIG. 2a comprises reflectors 105-113 which are held at their different heights by reflector support member 101. The tops of the reflectors may be beveled to reduce secondary reflections of ultrasonic waves by reflecting waves striking the top of the reflectors away from the probe and the transducer.

FIGS. 2a shows a constant spacing between adjacent reflectors 10. Equal displacement of the reflectors is not required but, as will be apparent from the discussion below, the equal displacement of reflectors may simplify certain steps in methods which use the tank gauging system of this invention.

The tank gauging system of this invention also includes a transducer 22 positioned below the reflectors and designed to be located underneath the surface of the liquid in the tank and at a known height above the bottom of the tank. Transducer 22 emits ultrasonic energy into the liquid and forms data signals from the received reflections of that energy off the bottom reflector edges 116 and off the surface of the liquid.

In the preferred embodiment of the tank gauging system of this invention, transducer 22 is a standard ultrasonic receiver/transmitter and forms a part of transducer assembly 20. It is also possible to have transducer 22 contain a separate ultrasonic receiver and transmitter. The ultrasonic transducer chosen for the system of this invention must be able to receive the reflections of ultrasonic signals reflected off the bottom edge 116 of each reflector and off the surface of the liquid in the tank.

FIG. 1 and FIG. 2a show that transducer 22 is supported at the top of transducer assembly 20. Transducer assembly 20 is connected to the bottom of reflector support member 101 and provides a path for the routing of signals to and from transducer 22.

Probe extension 104, seen in FIG. 2a, extends from support 101 below transducer assembly 20 to prevent transducer assembly 20 from striking the bottom of the tank. Extension 104 can also maintain probe 7, and therefore transducer 22, a known height above the bottom of the tank.

In the tank gauging system shown in FIGS. 1 and 2a, the reflectors most distant from transducer 22 are successively longer than the reflectors located closer to that transducer. This is done to ensure that reflections from the bottom edges 116 of the more distant reflectors, which travel a longer path than do reflections from closer reflectors, are sufficiently large to be detected by transducer 22. All the reflectors in the tank gauging system of this invention can, however, have the same length. There are two principal limitations on the lengths of the reflectors. First, the signals reflected from the most distant reflector must be able to be detected by the transducer 22 and second, the signals reflected from the reflectors must be discriminatably smaller than signals reflected off the liquid surface.

The embodiment of the invention in FIG. 2a shows the reflectors 10 in vertical alignment, but this is not required. Although it might seem that with a vertical alignment of the reflectors the reflectors closer to the transducer would block the transmitted energy from the more distant reflectors, this is not the case. Transmitted ultrasonic energy which is not reflected by a reflector "bends" around that reflector and can be reflected by more distant reflectors. Similarly, reflections of ultrasonic energy from a reflector "bend" around the reflectors lying closer to the transducer 22.

Figure 2B:
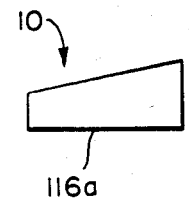
FIG. 2b is a side view of a reflector having a concave bottom edge.

The surfaces of the reflectors facing the transducer can be concave as shown in FIG. 2b. To maximize the amount of ultrasonic energy reflected back to the transducer 22, the radius of curvature of the concave edge 116a of each reflector would equal the distance between the reflector and the transducer 22. Such a design focuses the reflected ultrasonic signal back to the transducer. Each reflector in such a system would have a differently curved bottom surface.

A simpler approach to achieve the advantage of focusing is to manufacture reflectors with concave bottom edges all having the same radius of curvature. The most desirable curvature radius for such reflectors would be the distance between the transducer and the reflector farthest from the transducer.

Instead of the continuously curved surface shown on the bottom 116a of the reflector in FIG. 2b the concave bottom surface may consist of any curve or collection of segments that tend to focus incident ultrasonic signals back to the transducer 22.

Figure 3:
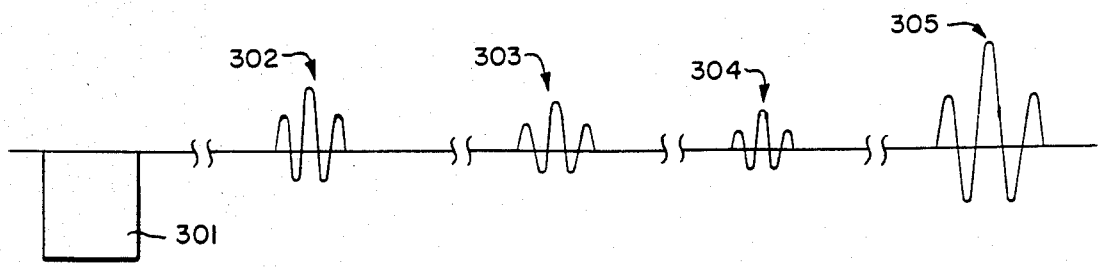
FIG. 3 shows typical electrical signals sent to and produced by the transducer shown in FIG. 1.

FIG. 3 shows typical electric signals at a transducer 22 according to an embodiment of the invention. Signal 301 is the electric signal sent to transducer 22. This is a negative signal which causes the transducer crystal to resonate and emit a burst of ultrasonic pulses into the liquid.

Signal 302 is formed by the transducer from the reflection of the transmitted pulse off of the reflector closest to the transducer. Signals 303 and 304 are formed by the transducer from reflections of the transmitted pulse off of more distant reflectors. Signal 305 is formed from the received reflection of a transmitted pulse off the surface of the liquid. Because the surface of the liquid is so large, the amplitude of the ultrasonic reflections off the surface of the liquid is substantially larger than the amplitude of the reflections of ultrasonic energy off the reflectors.

Because the tank gauging system of this invention may be used with flammable liquids and liquids which will explode if ignited, it is preferred that the tank gauging system be made explosion-proof or intrinsically safe.

In accordance with the present invention, the tank gauging system also includes means for causing the transducer to transmit ultrasonic energy and for receiving data signals formed by the transducer in order to determine the volume of the liquid in a tank. In the embodiment of the tank gauging system of this invention shown in FIG. 1, console 30, located inside service station building 40, is included in the transmitting causing and signal receiving means.

Figure 2C:
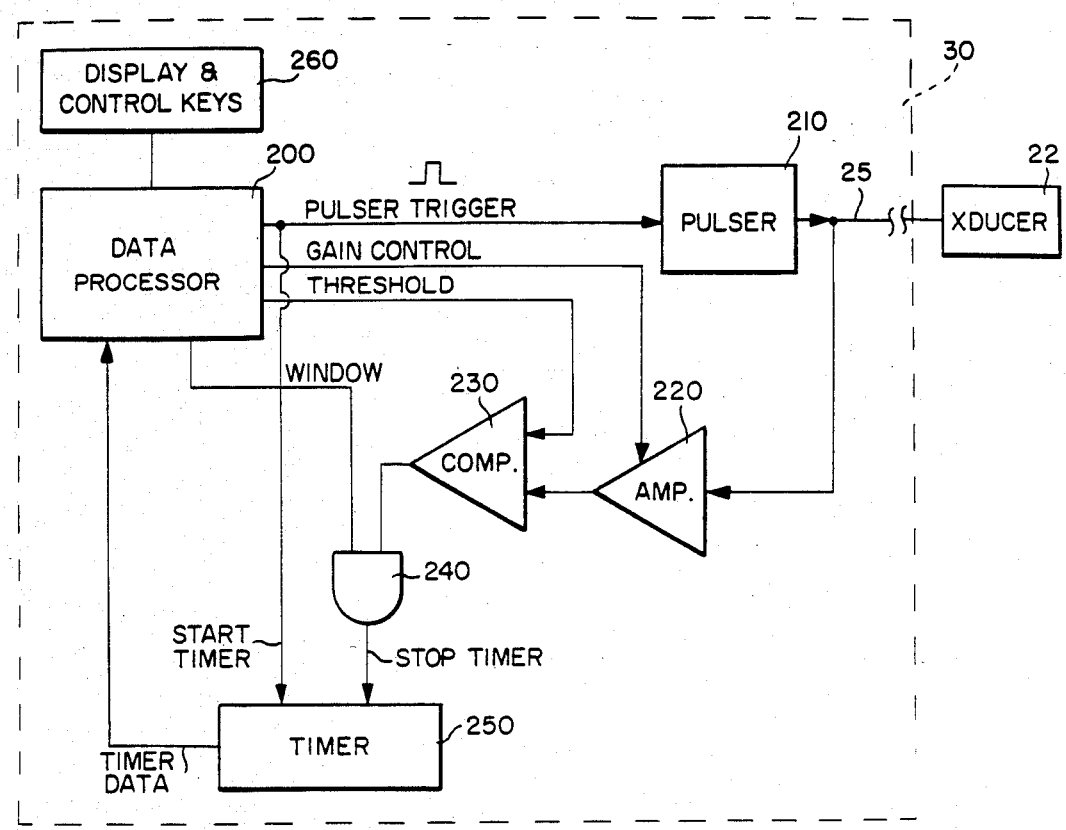
FIG. 2c shows a detailed diagram of the console used in the tank gauging apparatus of FIG. 1.

A detailed diagram of the components in the preferred embodiment of console 30 appears as FIG. 2c. Preferably, console 30 would include a data processor 200, for example a microprocessor, to give the tank gauging system of this invention flexibility and computing power. Data processor 200 sends out control signals and receives data signals in order to perform the desired processes.

One signal produced by data processor 200 is a trigger signal which is sent to pulser 210. The trigger signal causes pulser 210 to transmit an activation signal for tranducer 22. The activation signal, shown as negative-going pulse 301 in FIG. 3, causes transducer 22 to transmit a burst of ultrasonic signals (typically about ten pulses at the transducer's resonant frequency) into the liquid in the tank. Pulser 210 could have a variable amplitude control which would be set by data processer 200. In this manner, processer 200 could, by adjusting the amplitude of the activation signal, control the amplitude of the transmitted ultrasonic signal.

Console 30 communicates with transducer 22 via coaxial cable 25 which is carried inside conduit 26. As seen in FIG. 1, conduit 26 connects to standpipe cover 8.

The reflections of these transmitted ultrasonic signals are converted by transducer 22 into electrical signals (e.g., signals 302-305 in FIG. 3) and are sent to console 30 over coaxial cable 25.

In the preferred embodiment of the invention, console 30 also includes signal detection circuitry to convert the electrical data signals from the transducer into the form needed by data processor 200.

The signal detection circuitry should include means for adjusting its sensitivity. Such means may include, for example, a variable threshold circuit, a variable amplifier for increasing the amplitude of the data signals sent from the trasducer, or circuitry for increasing the amplitude of the excitation signal sent to the transducer.

In console 30, the data signals from transducer 22 are amplified by amplifier 220 and wave-shaped by comparator 230. Comparator 230 is synchronized with the data signals so the comparator output changes states when the data signal crosses the zero volt axis. Both the gain of amplifier 220 and the threshold level (i.e. reference level) of comparator 230 are controllable by data processor 200 to adjust the sensitivity of the tank gauging system of this invention.

The output of comparator 230 indicates whether a signal of sufficient magnitude is present. The comparator output is inputted to AND gate 240 along with a "window" signal from data processor 200. The "window" signal is active during the time period in which data processor 200 is searching for a data signal from transducer 22. The output of AND gate 240 indicates whether a transducer data signal of sufficient magnitude is present during the time period represented by the "window" signal.

Timer 250 has a start and stop input and one data output. Timer 250 is started by data processor 200 when the trigger signal is sent to pulser 210 and is stopped by the signal at the output of AND gate 240. Timer 250 thus measures the time interval between the transmission of an activation pulse and the receipt of a reflection from the that pulse (represented by a data signal from transducer 22) in the desired window. This time interval is available as an output to data processor 200.

Console 30 may also contain a display and control keys, identified in FIG. 2c by reference numeral 260. The program keys may be used to select the information displayed or to give commands and data to data processor 200. The information to be displayed may include data, such as time, tank temperatures or liquid height and volume, or the display may include instructions to the operator of the console.

Although FIG. 1 shows only one probe and one tank connected to console 30, it is possible to have connected to console 30 several probes each in a different tank. Such a system according to this invention would include means for causing the transducers in each of those probes to transmit ultrasonic signals and for receiving the data signals formed by the transducers in each of those tanks in order to determine the volume of liquid in each of those tanks. For example, such a system could have a console connected to several probes by several cables, each dedicated to a single tank, or by a single cable which is time-shared by the probes.

For certain measurements, some of which are described below, it is necessary to know the temperature of the liquid or of a portion of the liquid in the tank. The tank gauging system of this invention can also include means for measuring the temperature of the liquid in the tank. In a preferred embodiment of this invention shown in FIG. 1, this means includes thermometer 60 which can be a standard temperature-sensing device that converts temperature measurements to electrical signals. The temperature measuring means is located in the liquid and is connected to the transmitting causing and data receiving means (console 30 in FIG. 1) via the data communication lines. These data communication lines could include coaxial cable 25 which connect transducer 22 to console 30 or could include a separate set of coaxial cables.

This tank gauging system can measure the volume of liquid in a tank with great resolution, thus allowing detection of very small changes in liquid volumes and measurement of the amount of water in a gasoline tank. Furthermore all measurements with the system of this invention can be made automatically, without the intervention of a service station attendant. Several methods of measurements which can use the tank gauging system of this invention to achieve the objects of the present invention are explained below.

B. Measurement of Average Sound Velocity for the Liquid in a Tank

Figure 4:
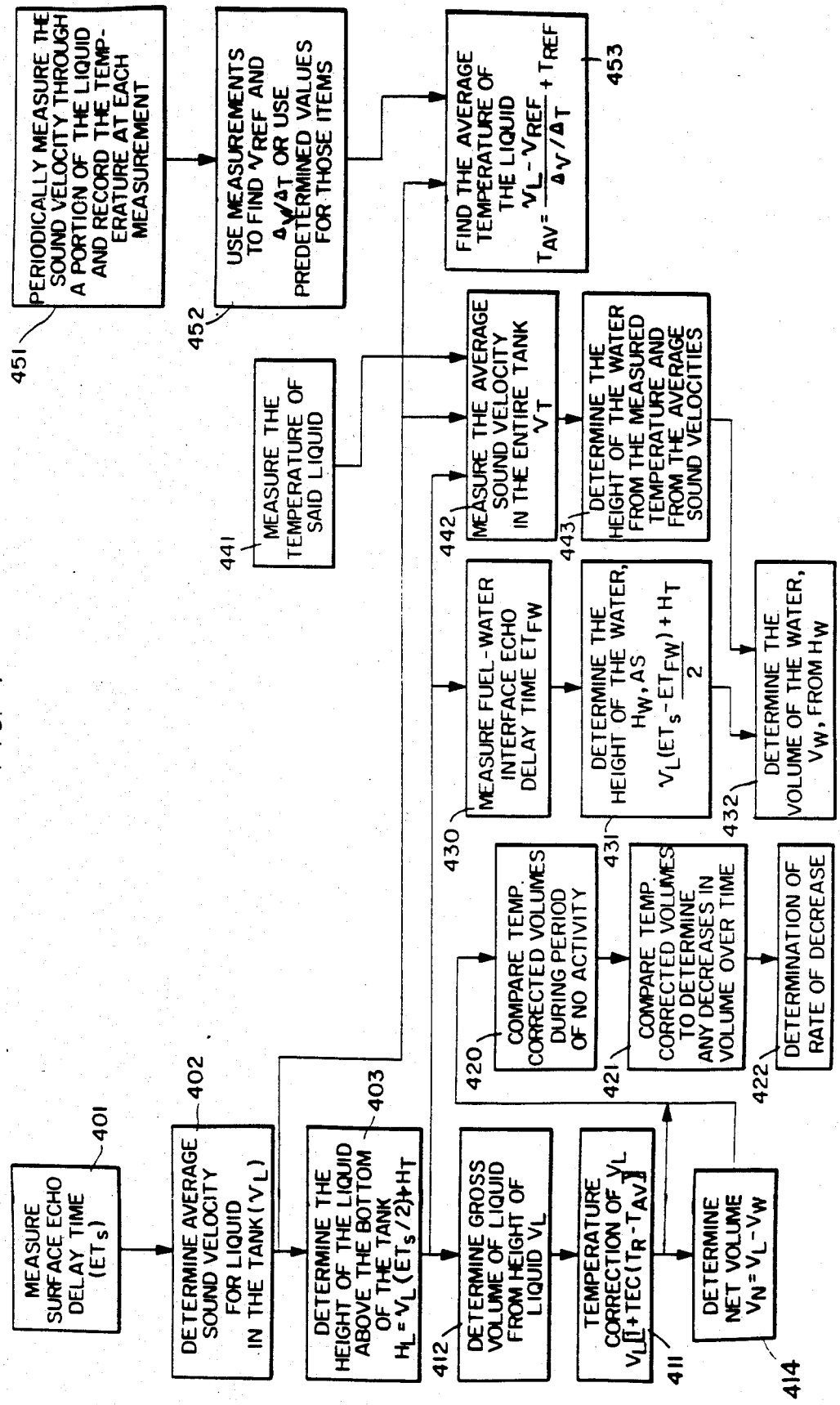
FIG. 4 is a block diagram showing different methods of this invention.

FIG. 4 shows a block diagram indicating different measurements or determinations which can be made with the tank gauging system of this invention. All of these measurements require the measurement of the average sound velocity for the liquid in a tank. Blocks 401 and 402 show the major steps for making such a measurement very accurately.

1. Measurement of surface echo delay time

The first step in such a measurement, step 401, is to measure a surface echo delay time, referred to as $ET_s$. $ET_s$ is the time it takes for an ultrasonic signal to be transmitted from a transducer, to be reflected off the surface of the liquid in the tank and be received back by the transducer. The detailed steps of this measurement are shown in FIG. 5.

The sensitivity setting and adjustment of the signal detection circuitry is described below in terms of threshold. It should be recognized that the sensitivity setting could also be, for example, the amplification factor (gain) of received data signals from a transducer or the amplification factor (gain) of the activation signal sent to a transducer.

In step 501, the threshold of a receiving device, for example the signal detection circuitry in console 30 of FIG. 2c, is set at a predetermined value. This predetermined value, if the sensitivity control is a threshold, can either be the maximum threshold setting of the receiving device or some predetermined level known to be appropriate for detecting surface reflections.

In the next step, step 502, a determination is made whether an echo, i.e. a reflection of an ultrasonic signal, has been received. To describe this step in further detail, reference is made to FIG. 12 which shows a signal representing the reflection of an ultrasonic signal off the surface of the liquid. When the threshold of the receiving device is set at the level x, for instance, the transmitted signal's reflection shown in FIG. 12 will not be detected.

Figure 12:
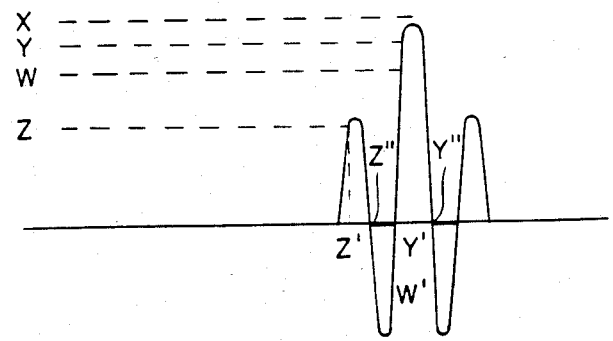
FIG. 12 shows a typical transduced signal representing a reflected ultrasonic pulse.

If no echo or reflection is received, the threshold of the receiving device is decreased, step 503, and another inquiry is made regarding the receipt of an echo, step 502. The loop comprising steps 502 and 503 is continued until an echo is received. Referring to FIG. 12, when the threshold is decreased to value y, then the receiving device will detect the presence of the illustrated reflection. If the console in FIG. 2c is used with this method processor 200 adjusts the sensitivity and determines whether an echo was received.

Because echoes from the surface are, in this method, detected before echoes from the reflectors, the reflectors must be designed to ensure that the amplitude of their echoes is sufficiently smaller than the amplitude of the surface echoes to allow discrimination between surface echoes and reflector echoes.

When an echo is received, it must be determined whether this was the first echo received, because a slightly different procedure is followed for first echoes. This determination is step 510.

If the most recently received echo was the first echo received, then the echo delay time, which is the time between the transmission of an ultrasonic pulse and the measured receipt of the echo, is recorded as the new value for $ET_s$. The echo delay time appears at the output of timer 250 in the embodiment shown in FIG. 2c.

If the threshold were set at value y, then the time of receipt of that pulse would be at time y'. In using the preferred embodiment of the circuitry shown in FIG. 2c, the time which would be recorded is y", the following zero-crossing. The recorded receipt times of different pulses in a burst thus differ by integral numbers of pulse periods.

After the new value for $ET_s$ is recorded, the threshold is again decreased in step 512 in an attempt to detect an earlier one of the reflected pulses in a burst. The most accurate measurement of $ET_s$ is obtained by detecting the reflection of the first-transmitted pulse in the burst.

If, upon decreasing the threshold, predetermined minimum threshold is reached, then the measuremet of $ET_s$ is complete and is the most recently measured value for $ET_s$. The determination of a minimum threshold indicates that no more accurate measurement of $ET_s$ is possible.

If the threshold is not at a minimu, then the next echo is received in step 515 and the same question is asked with regard to whether this echo was the first received. If this echo is not the first received, then a comparison is made between the pulse period (one full cycle of a pulse in the transmitted burst) and the difference between the last measured echo delay time and the previously measured echo delay time.

If, for example, the threshold were set at level w, then the echo delay time would be measured from point y" (not w' for the reason described above). In this case, the last two echo delay times would be equal and their difference would be less than one pulse period so steps 512 and 514 would be repeated. Assuming that the threshold was not at a minimum, another echo would be received with the receiver set a lower treshold.

If the next threshold value were level z in FIG. 12, then the echo delay time would be measured from point z". The difference between the last two measured echo delay times, then, would be equal to one period. In this case, the echo delay time measured from point z" would then be the new value for $ET_s$ and steps 512 and 514 would be repeated.

This method of "stepping back down" the received ultrasonic pulse burst is continued until either a minimum threshold is reached, step 514, or the third condition in step 520 is encountered: the difference between the last two echo delay times is greater than one pulse period. This third condition occurs if the last received echo signal is noise rather than a reflection of the transmitted signal. In such a situation, no more accurate a value for $ET_s$ can be determined so the echo delay time for the signal received prior to receiving the noise signal is deemed to be the most accurate value for $ET_s$.

By making the period of the transmitted pulse, which is a function of the resonant frequency at the transducer crystal, sufficiently short, any error in measuring $ET_s$ can be maintained at a low value. Furthermore, by stepping slowly back down the different pulses of the receved pulse burst, it can be determined that the received signal is actually a reflection rather than a noise signal.

In measuring the surface echo delay time, disturbances on the surface may cause some variation in the amplitude of the echoes or reflections received by transducer 22. To reduce the possibility that these variations will cause an erroneous reading of $ET_s$, the threshold can be set at a value intermediate between the value needed to detect the echo being received and the value needed to detect the next earlier echo pulse in the burst.

Additional accuracy can be gained by taking multiple measurements at each threshold setting and averaging the measurements.

2. Measurement of reflector echo delay times

Returning to FIG. 4, the step of measuring the average sound velocity, step 402, requires measuring reflector echo delay times, the steps for which are shown in FIGS. 6-9.

In FIG. 6, the first step, 601, is to measure the closest reflector echo delay time referred to as $ET_c$. In this method, there are a plurality of reflectors, as shown, for example, in FIGS. 1 and 2a.

The details of the measurement for $ET_c$ are shown in FIG. 7. The first step of such a measurement, step 701, involves the setting of a window for the closest reflector. That window is a time window in which to look for the ultrasonic pulse reflections from the reflector closest to the transducer. The duration and timing of this window is determinable from, for example, the distance between the transducer and the reflector closest to the transducer and from the possible range of sound velocities in the liquid being measured. The value for this window would, in the preferred embodiment of the tank gauging system described above, be stored in the data processor.

Once this window is set, $ET_c$ is measured from the reflections received in that window. The method of making this measuement is shown in FIG. 9, which method is similar to that outlined in FIG. 5. Since the reflected signals from the reflectors will be smaller in amplitude than the signals reflected from the liquid surface, the threshold of the receiver in the preferred embodiment of this method is initially set to a lower value than it is when receiving reflections from the surfae of the liquid. In FIG. 9, the threshold is set (step 901) and is decreased (steps 902 and 903) until an echo is received (step 902).

When the first echo is received (step 910) the value for the most recently measured echo delay time (actually the zero-crossing time) is recorded as the new value for the echo delay time for the particular reflector (step 911). The threshold is then decreased (step 912) and, if the threshold is at a minimum (step 914), then the last-measured echo delay time is the value for the reflector echo delay time. If the threshold is not at a minimum, then the next echo is received and the period of the transmitted or received pulse is copared to the difference between the last two measured echo delayed times (step 920). If that difference is less than one pulse period, then steps 912 and 914 are repeated.

If that difference is equal to one pulse period then the echo delay time from the most recently received echo becomes the new reflector echo delay time (step 911) and the threshold is decreased again (step 912). If, however, the difference between the last two measured echo delay times is greater than one pulse period, then it is assumed that the most recently received echo was a noise signal and the reflector echo delay time is the last value entered for that time.

Once the closest reflector echo delay time is determined in step 601 of FIG. 6, it must be determined whether there are additional submerged reflectors. This can be done, for example, from the heights of all the reflectors and $ET_s$. If there are additional submerged reflectors, then step 611, which requires the measurement of the echo delay time for the next most distant reflector from the transducer, is performed. The details of measuring the echo delay time for next reflector at the delay time are shown in FIG. 8.

In step 801, a window for the next reflector is set based on the measured and estimated echo delay times for the last reflector, i.e., the reflector located next closest to the transducer. For each reflector, there is stored an estimated echo delay time similar to the estimated window for the closest reflector. After the echo delay time for a reflector is measured, a proportionality constant is calculated as the ratio of the measured echo delay time to the estimated echo delay time of that reflector. This proportionality constant indicates, in a general manner, how much the measured echo delay time for that reflector differs from the estimated echo delay time and provides a tool for estimating how much the next reflector's measured echo delay time will differ from its estimated echo delay time.

The proportionality constant is multiplied by the estimated echo delay time for the next reflecor to form a revised estimated echo delay time for the next reflector. The window in which reflections from the next reflector will be searched is centered around this revised estimate for the next reflector echo delay time.

In step 802, an echo delay time for the next reflector is measured from reflections received in the window for that reflector. The details of this measuremet are seen in the method shown in FIG. 9. The individual steps of that method have been previously explained.

3. Determination of average sound velocity

If there are no other submerge reflectors, the average sound velocity in the liquid, $v_L$, can be-calculated from the known height of the highest submerged reflector, $H_{HR}$, and from the echo delay time of the highests submerged reflector $ET_{HR}$. Thus:

$$v_L = (H_{HR} - H_T)(2/ET_{HR}). \text{ } H_T \text{ is the height of the transducer above the bottom of the tank.}$$

The reason for making this determination by the method outlined in FIG. 6 is to provide great accuracy for the determination of the sound velocity in the liquid. Since certain liquids, like gasoline, are nonhomogoneous, the sound velocity may vary slightly in different portions of the liquid volume. The most accurate determination of sound velocity from this method requires measurements which take into account the maximum liquid volume, hence the submerged reflector closest to the surface is used. It is difficult, however, to detect which reflections are from the highest submerged reflector. That is why reflections from the closest reflector, to the transducer are detected first and reflections from successively farther transducers are detected until the reflections from the highest submerged reflector are found.

C. Measurement of Height or Net Volume of the Liquid in a Tank

The measurement of net volume includes steps 403-412. In step 403, the height of the liquid above the bottom of the tank, $H_L$, is determined from the surface echo delay time, $ET_S$, and from the velocity of sound in the liquid, $v_L$, by the following equation:

$$H_L = v_L(ET_S/2) + H_T$$

Once the height of the liquid about the bottom of the tank is known, the gross volume of the liquid (see step 412), $V_L$, can be determined either mathematically, if the exact geometry of the tank is known, or from a table relating the height of liquid in the tank to its volume.

The accuracy of this determination of gross volume comes from the precise measurements of $ET_S$ and $v_L$ afforded by the method of this invention. Such accuracy allows this invention to accomplish its objects.

This determination of the gross volume may not be accurate enough for many applications because the volume of a liquid varies with the temperature of that liquid and the variation in a particular liquid may mask a drop in volume due, for example, to leakage. This variation with temperature is usually by a value called the Temperature Expansion Coefficient or TEC.

In step 411, the gross volume is temperature-corrected by multiplying it by $(1+TEC(T_R-T_{AV}))$. TEC is the temperature expansion coefficient for the particular liquid, $T_R$ is a reference temperature and $T_{AV}$ is an average temperature of the liquid. A method for accurately determining the average temperature of the liquid is described below.

The gross volume of liquid, however, may not be of interest, especially if the tank contains gasoline. In gasoline tanks, there is often an accumulation of water at the bottom of the tank. To determine the net volume of gasoline in a tank, it is necessary to subtract from the gross volume of liquid in the tank $V_L$, the volume of water, $V_W$, in the tank (step 414). There are described below techniques for determining the volume of water in a tank.

The accuracy of the method of determining the net volume of liquid in a tank just described makes it ideal for use in detecting the loss of product due to theft or leakage.

D. Theft or Leak Detection

Of course, one method of detecting the theft of liquid from a tank is by noting unauthorized dispensing of that liquid. There may be instances, however, when such a method will not work. Furthermore, it is may be desired to detect leakage of the liquid from the tank. Leakage occurs at a very slow rate so accurate determinations of the volume of the liquid in the tank are needed for such detection.

A method of theft or leak detection using the gross volume measurement method described above is shown in FIG. 4, boxes 420-422. The method can also compae net volumes, however it is important to know whether the leakage from the tank involves only, water and a comparison of net volume will only identify a leakage of fuel.

In step 420, there is a comparison of temperature corrected gross volumes of liquid during periods of no activity. A period of no activity occurs when no deliveries are made to the tank of liquid and no authorized dispensing of that liquid is taking place. In a service station, this can occur overnight or on holidays, or such a period can be regularly scheduled so that a particular tank is shut down to check for leakage or theft.

Because the volumes compared are temperature-corrected, this method can determine whether any decrease in volume is due to a change in temperature or due to the loss of liquid by theft or by leakage.

In step 421, any decreases in temperature-corrected volumes are noted, and in step 422, the rate of such decreases are determined from the measured loss in volume and the time during which that loss occured. From the rate of decrease, it can be determined whether a loss in volume is signficant, and, if it is, whether that loss is due to theft or leakage. For thefts the rate of change of volume will not be steady: large losses of volume over a very short time and no changes in volume for long periods of time. In the case of leakage, there will be small, relatively constant decreases in volume over very large periods of time.

In leakage detection especially, it is necessary to have a high resolution volume measurement, and the method described above for measuring the volume of liquid in a tank for a range of temperatures is ideally suited for such detection.

E. Water Volume Measurement

Method I

One method of water volume measurement according to the present invention is shown in steps 401-403 and 430-32. First, the surface echo delay time, $ET_S$, the average sound velocity of the total amount of liquid in a tank, $v_L$, and the total height of the liquid above the bottom of the tank, $H_L$, are all determined as indicated above (steps 401-403). The next step is to measure the fuel-water interface echo delay time, $ET_{FW}$, a indicated in step 430. $ET_{FW}$ differs from the other echo delay times described since its measurement involves three reflections as seen by reference in FIG. 13.

As FIG. 13 shows, $ET_{FW}$ has four components comprising the transmitted signal and three reflections. The first component is time $t_1$, which is the time it takes an ultrasonic pulse to travel from the transducer to the surface of the liquid in the tank. The second component of $ET_{FW}$ is $t_2$, which is the time it takes for the ultrasonic pulse to travel between the surface of the liquid of a tank and the fuel-water interface after the ultrasonic pulse has been reflected the first time. The third component of $ET_{FW}$, $t_3$, is the time it takes the ultrasonic pulse burst to travel between the fuel-water interface and the surface of the fuel after being reflected off the fuel-water interface. The final component of $ET_{FW}$ is shown in FIG. 13 as $t_4$ which is the time it takes the ultrasonic pulse burst to travel between the surface of the liquid and the transducer after being reflected a third time.

Figure 10:
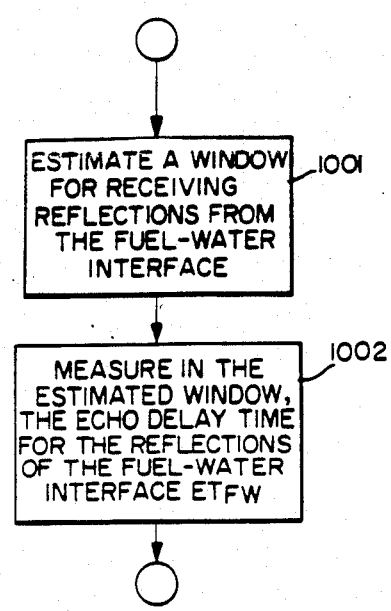
FIG. 10 is a flow diagram for measuring a fuel-water interface echo delay time according to one method of this invention.

The details for measuring the fuel-water interface echo delay time are shown in FIG. 10. First, as step 1001 indicates, a window is estimated for receiving the reflections of the fuel-water interface. This estimate can be based upon the determine of values for $ET_S$, $v_L$ and $H_L$, as well as on an estimated range of water level heights.

The next step, step 1002, is to look for reflections in the estimated window and measure $ET_{FW}$. The measurement of $ET_{FW}$ involves the method shown in FIG. 9 which has been previously explained.

Once $ET_{FW}$ is measured, then the height of the water in the tank, $H_W$, is determined according to the equation shown in step 431:

$$HW = v_L(ET_s - ET_{FW}/2) + H_T.$$

The derivation of this equation stems from the definition of $ET_{FW}$. As seen in FIG. 13:

$$\begin{aligned} ET_{FW} &= t_1 + t_2 + t_3 + t_4 \\ &= t_1 + t_4 + t_2 + t_3 \\ &= ET_s + ET_W, \end{aligned}$$

where $ET_W$ is twice the time required for an ultrasonic pulse to travel between the surface of the liquid and the fuel-water interface.

Thus:

$$ET_W = ET_{FW} - ET_s.$$

The height of the water, $H_W$ is equal to the difference between the height of the liquid, $H_L$, and the distance between the surface of the liquid and the fuel-water interface. In other words:

$H_W = H_L - v_L(ET_W/2)$. From the equations for $H_L$ (step 403) and $ET_W$:

$$\begin{aligned} H_W &= v_L(ET_s/2) + H_T - v_L[(ET_{FW} - ET_s)/2] \\ &= v_L(ET_s - ET_{FW}/2) + H_T. \end{aligned}$$

This last equation is the equation set forth in step 431 in FIG. 4.

In step 432, the volume of water, $V_W$ is determined from the height of the water, $H_W$, in much the same way as the gross volume of the liquid, $V_L$, is determined from the height of the liquid, $H_L$, in step 410. This can be either by a table lookup method or by calculation if the geometry of the tank is known. Usually, water height rather than water volume is displayed since the nearness of the water to the transducer is of primary importance.

This method for measuring the volume of water is especially effective if the fuel-water interface is not close to the level of the transducer. If the transducer is close to the fuel-water interface, then the reflections from the fuel-water interface may create problems in detecting $ET_{FW}$.

Typically water height rather than water volume will be displayed to the operator since water height gives a more readily observed indication of whether the amount of water in the tank is at a dangerous level.

Method II

Another method of measuring water volume according to this invention is seen in FIG. 4 by the steps 401–403 and 441–443 and 432.

In step 441, the temperature of the liquid in the tank is measured either by a thermometer or by some other method, such as the method described below. In step 442, the average sound velocity in the entire tank, $v_T$, is measured. This measurement differs from the measurement in step 40 which only measured the velocity of sound through the liquid above the transducer. If there was water at the bottom of the tank, the sound velocity that was measured in step 402 is just the sound velocity through the fuel and not through both the fuel and the water.

The detailed steps for measuring the average sound velocity in the entire tank are shown in FIG. 1. In the first step of that method of measurement, a window for receiving reflections off the bottom of the tank (or off a lip on the transducer which lies below the fuel water interface) is estimated. Such an estimate may be made from $ET_S$, $v_L$ and $H_L$.

Figure 11:
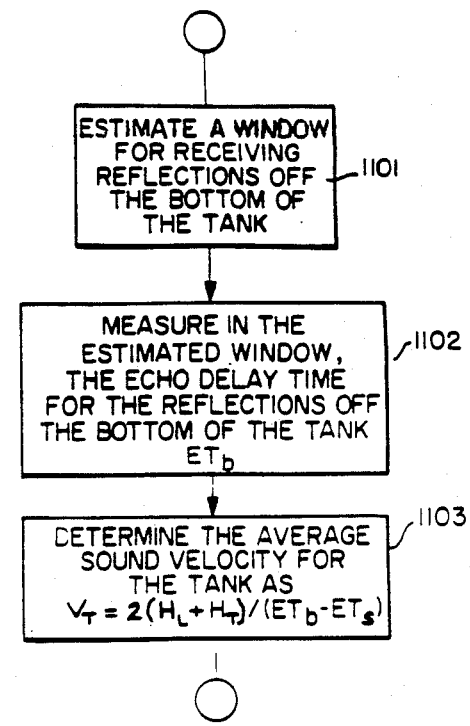
FIG. 11 is a flow diagram for measuring the average sound velocity in an entire tank according to one method of this invention.

The echo delay time being measured in FIG. 11 is the echo delay time off the bottom of the tank, $ET_b$, as shown in FIG. 14. Rather than using reflections of the bottom of the tank, $ET_b$ can be measured using reflections off a transducer lip. The lip on the transducer is used especially when the bottom of the tank is believed to contain debris.

$ET_b$ is equal to the sum of times $t_5$–$t_8$. Time $t_5$ is the time it takes an ultrasonic pulse to travel from the transducer to the surface of the fuel. The time for the pulse to travel from the fuel surface to the bottom of the tank or the transducer lip after the first reflection is tie $t_6$, and the time for that reflection to travel back from the bottom of the tank or transducer lip to the surface of the fuel is time $t_7$. Time $t_8$ is the time it takes for the ultrasonic pulse to travel from the surface of the fuel back to the transducer after being reflected a third time.

Next, $ET_b$ is measured by detecting reflections in the estimated window for the bottom echo delay time (step 1102). Again, in the preferred embodiment this measurement uses the method shown in FIG. 9.

Step 1103 (see FIG. 11) contains an equation for determining the average velocity for the entire tank. The average sound velocity of the entire tank, $v_T$, is the distance from the surface of the liquid to the bottom of the tank, $H_L + H_T$, divded by the time it takes for an ultrasonic pulse to travel that distance, $t_B$. If the reflections off the transducer lip are used instead, the value for $H_T$ is adjusted accordingly.

FIG. 14 shows that:

$$\begin{aligned} ET_b &= t_5 + t_6 + t_7 + t_8 \\ &= t_5 + t_8 + t_6 + t_7 \\ &= ET_s + 2t_B. \end{aligned}$$

Thus:

$$t_B = (ET_B - ET_s)/2; \text{ and}$$

$$v_T = (H_L + H_T)2/(ET_b - ET_s)$$

Figure 15:
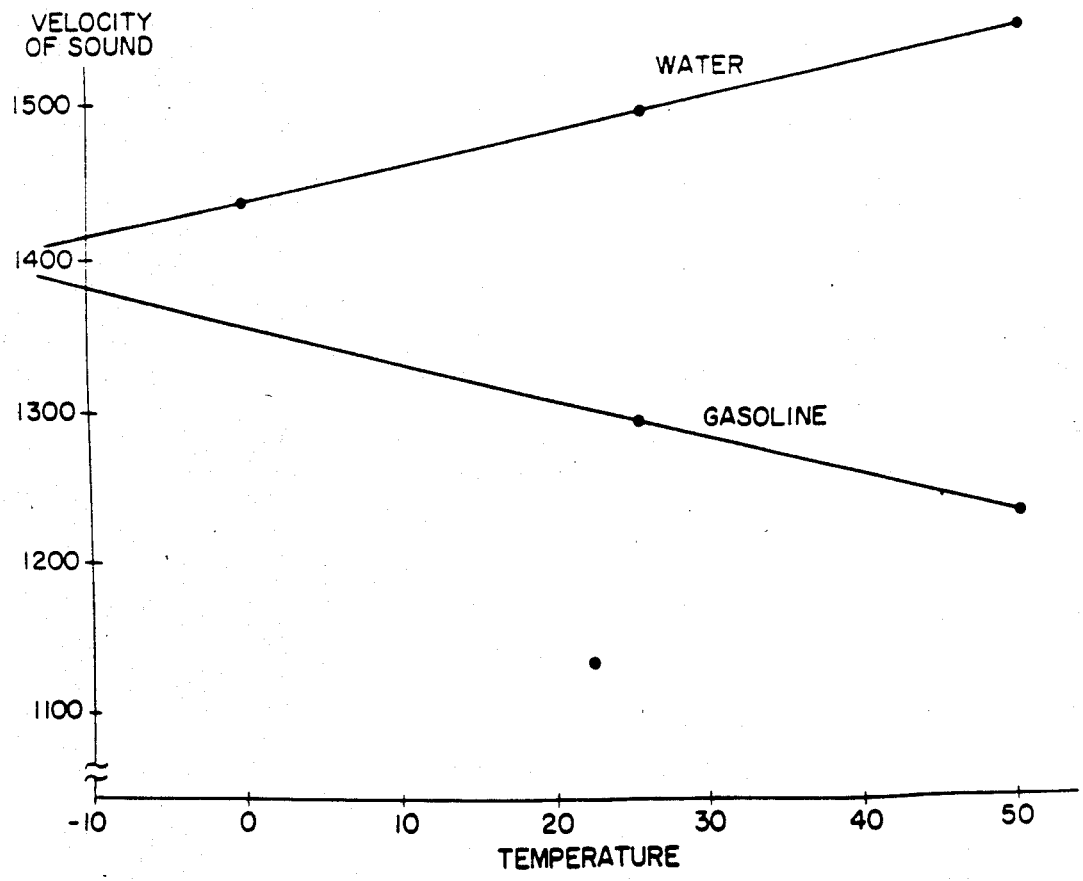
FIG. 15 is a graph showing sound velocities in different liquids at the same temperature.

The height of the water in the tank is determined in step 443 by comparing the average sound velocities in the fuel, $v_L$, and in the entire tank $v_T$, for the measured temperature. If the velocity of sound is sufficiently different through water and through fuel for the measured temperature, graphs, such as the one in FIG. 15 which shows a relationship between velocity of sound through a fuel and through water at a certain temperature, can be used to determine what height of water must be contained in the tank to account for the differences in sound velocities in the entire tank and in the fuel.

Once the height of the water is known, the volume of the water can be determined by methods described in relationship to step 432.

This method of measuring water volume is most accurate when the volume of water is substantial and thus can be used in those instances when the fuel-water inerface is close to the height of the transducer. This method works best when the velocity of sound through fuel is appreciably different at all temperatures from the velocity of sound through water.

Another advantage of this method is that the change in the velocity of sound with temperature throuhg many fuels is in a direction different from the sound change in the velocity of sound with temperature through water.

F. Determination of Average Temperature

A method of determining the average temperature of the liquid in the tank is shown in FIG. 4 by steps 401, 402 and 453. Additionally, steps 451 and 452 can be used to provide greater accuracy for that temperature measurement.

The surface echo delay time, $ET_s$, and the average sound velocity of the liquid in the tank, $v_L$, are determined in steps 401 and 402.

The average temperature of the liquid can be determined in step 453 if several values are known. The first value that must be known is how the velocity of sound in that liquid changes with the change in temperature, $\Delta v/\Delta T$. This value has been determined for many liquids. The other value that must be known is the velocity of sound through the liquid, $v_{Ref}$, at some reference temperature, $T_{Ref}$.

The change in velocity of the sound through the liquid, $v_L - v_{Ref}$, divided by the difference between the liquid's temperature and the reference temperature, $T_{Av} - T_{Ref}$, should equal $\Delta v/\Delta T$. In other words:

$$T_{Av} = (v_L - v_{Ref})/(\Delta v/\Delta T) + T_{Ref}.$$

This equation can be simplified $T_{Ref}$ is made equal 0 degrees.

If the values for $\Delta v/\Delta T$ and $v_{Ref}$ at $T_{Ref}$ are not known, or if it is desired to know value with a greater accuracy, these values can be determined by the steps 451 and 452.

In step 451, the velocity of sound through a portion of the liquid is measured periodically and for each such velocity measurement, a temperature measurement is also taken. Such a temperature measurement can be taken by some type of thermometer. In a preferred embodiment of this method, the sound velocity and temperature would be measured in the region between the transducer and the reflector lying closest to the transducer. The advantage of taking the measurements in this region is that in a small region, the temperature is relatively constant.

The sound velocity can be measured by determining $ET_c$, the echo delay time of the closest reflector, and dividing it into twice the distance between the transducer and the reflector closest to the transducer.

Figure 16A:
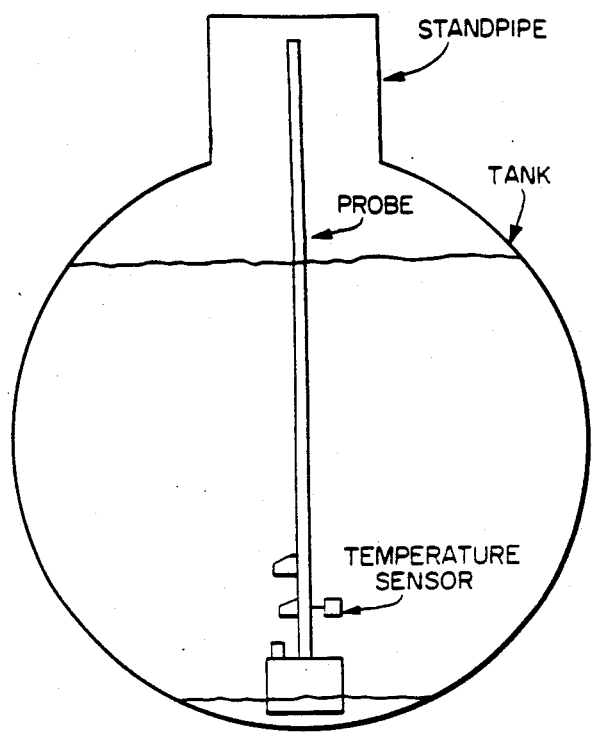
FIG. 16a shows one embodiment of this invention for measuring the temperature in a liquid.
Figure 16B:
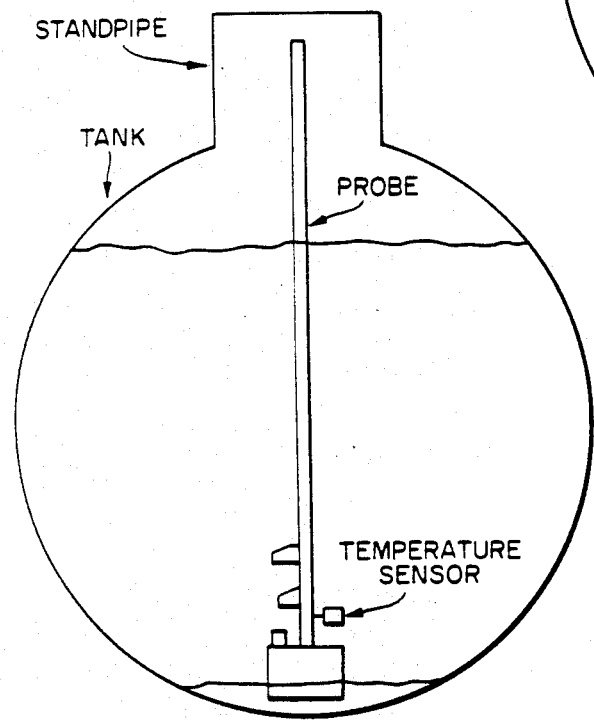
FIG. 16b shows another embodiment for measuring the temperature in a liquid.
Figure 16C:
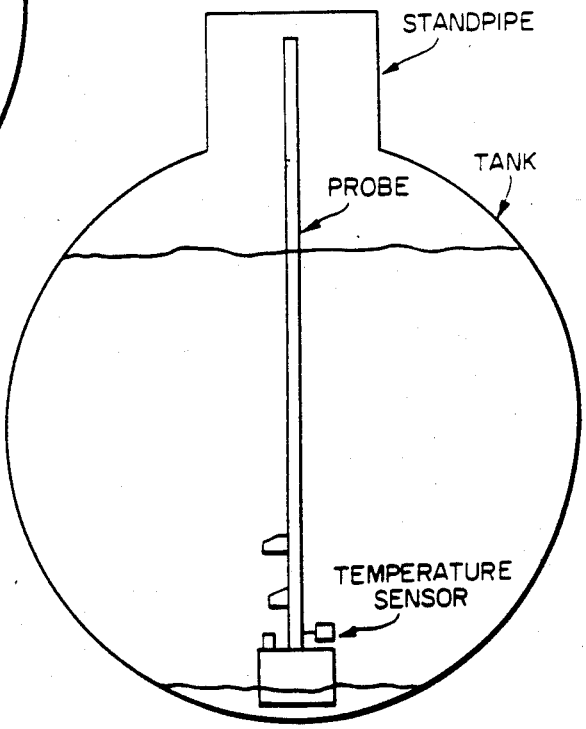
FIG. 16c shows a third embodiment for measuring the temperature in a liquid.

FIGS. 16a-16c show three possible placements for the thermometer. Such a device can be located adjacent to the closest reflector, shown in FIG. 16a, at a point between the closest reflector and the transducer, shown in FIG. 16b, or adjacent the transducer, shown in FIG. 16c.

When several velocity and temperature measurements have been taken, $\Delta v$ and $\Delta T$ can be determined accurately for the liquid at particular temperatures. In addtion, the reference velocity of the liquid, $v_{Ref}$, can also be determined for a reference temperature, $T_{Ref}$, with great accuracy, hence the average temperature determination in step 453 can be very precise.

It will be apparent to those skilled in the art that modifications and variations can be made in the tank gauging system and methods of this invention. The invention in its broader aspects is not limited to the specific details in the representative methods and preferred embodiments shown and described. Departure may be made from such details without departing from the scope an spirit of the general inventive concept.

What is claimed:

1. A system for determining the amount of liquid in a tank comprising:
   (a) support member;
   (b) a plurality of ultrasonic reflectors spaced at predetermied distances from each other along said support member, so that each of said reflectors lies at a predetermined height above the bottom of said tank;
   (c) transducer means positioned below said reflectors and located underneath the surface of and within said liquid in said tank and at a known height spaced from and above the bottom of said tank, said transducer means being operable for transmitting ultrasonic energy upwardly through said liquid towards the underside of said surface and for forming data signals representing the reflections of said transmitted energy off of the submerged ones of said plurality of reflectors and off of the surface of said liquid, and
   (d) control means for operating said transducer means, said control means including signal processing means for receiving said data signals from said transducer means, signal detection circuitry coupled to said signal processing means and including means for varying detection sensitivity in a predetermined sequence of successive steps of increasing sensitivity until said data siganls representing reflection of said transmitted energy off of said surface of said liquid are received and detected, means for computing an average velocity of said ultrasonic energy in said liquid from said detected data signals representative of reflections from the highest one of said submerged reflectors, for computing the height of said surface of said liquid from said bottom of said tank utilizing said computed average velocity and for thereby determining the amount of liquid in said tank.

2. The system in claim 1 wherein said ultrasonic reflectors are vertically aligned.

3. The system in claim 2 wherein said ultrasonic reflectors are equally spaced from one another.

4. The system in any one of claims 1, 2 or 3 wherein the more distance an ultrasonic reflector is from said transducer, the longer is its horizontal dimension.

5. The system in claim 1 further including a substantially vertical support member connected to said reflectors and to said transducer.

6. The system in claim 5 wherein the bottom surfaces of said ultrasonic reflectors are concave.

7. The system in claim 6 wherein the radius of curvature of each of said concave surfaces of said reflectors is constant.

8. The system of claim 1 wherein said signal detection circuitry includes means for varying a threshold, at which signal detection occurs in successive steps of decreasing threshold until data signals representing reflection of said transmitted energy off of said under surface of said liquid are received and detected.

9. The system in claim 1 wherein said signal processing means includes a microprocessor.

10. The system in claim 1 wherein said control means further includes:
   (i) a pulser connected to said signal processing means for causing said transducer means to transmit ultrasonic energy into said liquid;
   (ii) signal detection circuitry for receiving said data signals from said transducer means and for indicating whether a reflection of said transmitted energy was received by said transducer means within a predetermined time window; and
   (iii) timer means connected to said signal processing means and said signal detection circuitry to measure the time between the transmission of ultrasonic energy and the receipt within said predetermined time window of reflections of said transmitted energy.

11. The system in claim 10 wherein said transducer means is responsive to pulses from said pulser for transmitting ultrasonic energy of variable amplitude.

12. A system for determining the liquid in a tank comprising:
   (a) a plurality of ultrasonic reflectors spaced at predetermined distances from each other so that each of said reflectors lies at a different predetermined height in said tank;
   (b) a transducer, positioned below said reflectors and designed to be located underneath the surface of said liquid in said tank and at a known height spaced from and above the bottom of said tank, for transmitting ultrasonic energy through said liquid and for forming data signals representing the reflections of said transmitted energy off of the submerged ones of said plurality of reflectors within said liquid, and off of the under surface of said liquid;
   (c) control means for causing said transducer to transmit ultrasonic energy, said control means including signal processing means for receiving said data signals formed by said transducer, signal detection circuitry coupled to said signal processing means and including means for varying detection sensitivity in a predetermined sequence of successive steps of increasing sensitivity until said data signals representing reflection of said transmitted energy off of said surface of said liquid are received and detected, means for computing an average velocity of said ultrasonic energy in said liquid from said detected data signals representative of reflections from the highest one of said submerged reflectors; and
   (d) means for calcualting a temperature of said liquid in said tank from a liquid reference temperature and said average velocity as computed from said data signals in order top accurately determine the temperature compensated volume of said liquid in said tank.

* * * * *

Disclaimer 4,748,846 - John S. Haynes, Greensboro, N.C. TANK GAUGING SYSTEM AND METHODS. Patent dated June 7, 1988. Disclaimer filed April 5, 1999, by the assignee, Gilbarco, Inc.

Hereby enters this disclaimer to all claims of said patent.

*(Official Gazette,* June 1, 1999)